Dec. 8, 1964   D. W. WANER   3,160,027
BELT AND DRUM REMOTE CONTROL UNIT
Filed Aug. 27, 1962   3 Sheets-Sheet 1
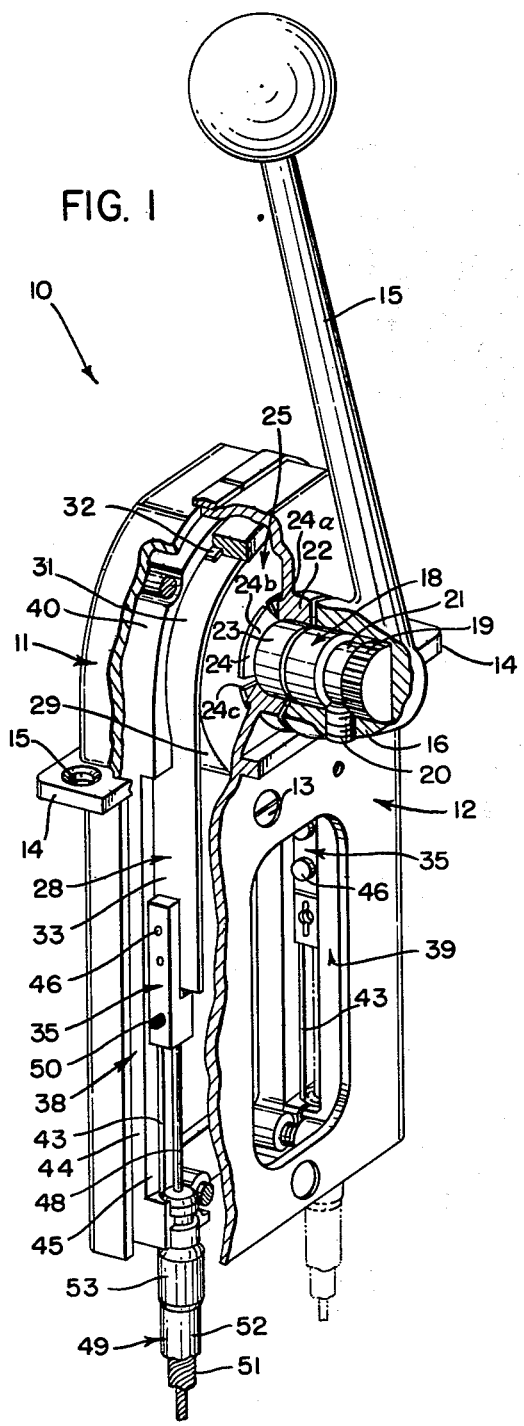
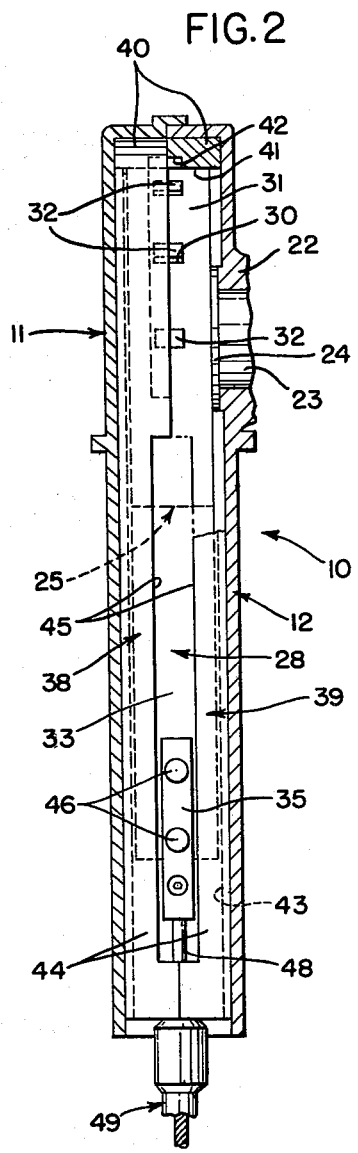
INVENTOR.
DONALD W. WANER
BY *Hamilton & Cook*
ATTORNEYS

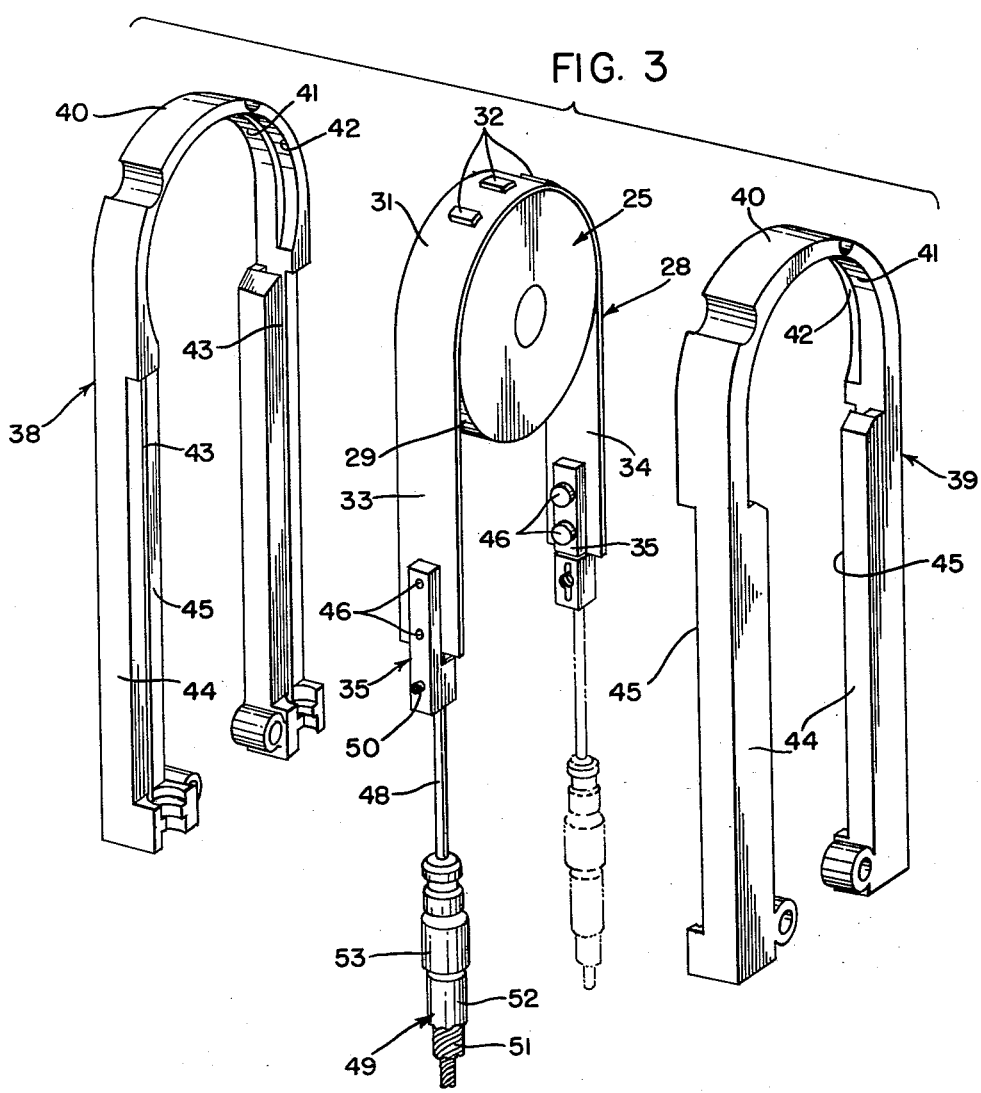

Dec. 8, 1964  D. W. WANER  3,160,027
BELT AND DRUM REMOTE CONTROL UNIT
Filed Aug. 27, 1962  3 Sheets-Sheet 3

INVENTOR.
DONALD W. WANER
BY Hamilton & Cook
ATTORNEYS

United States Patent Office 3,160,027
Patented Dec. 8, 1964

3,160,027
BELT AND DRUM REMOTE CONTROL UNIT
Donald W. Waner, Munroe Falls, Ohio, assignor to The Morse Instrument Co., Hudson, Ohio, a corporation of Ohio
Filed Aug. 27, 1962, Ser. No. 219,428
4 Claims. (Cl. 74—501)

The present invention relates generally to a remote control unit. More particularly, the present invention relates to a control unit particularly suitable for the remote control of the clutch or throttle of the marine engine. Specifically, the present invention relates to a remote control unit utilizing a drum and flexible belt.

To effectively and enjoyably operate a boat, whether commercial or pleasure, it is generally desirable to be able to operate the engine controls at a station remote from the engine. The traditional remote control unit presents one or more control levers which are rotated to effect the desired operation of the engine controls. So long as a balanced remote transfer system is being utilized the remote control unit can simply comprise a sprocket or other suitable pulley or drum means, which could be controllably rotated by the control lever. One form of a balanced remote transfer system is disclosed in U.S. Patent No. 2,737,822, to John F. Morse from which it is immediately clear that the control cables form a closed system so the control transmissions are always relayed as tensile stresses. Rotation of the control or hand lever of the mechanism disclosed in Patent No. 2,737,822 rotates an attached sprocket which turns a roller chain meshed therewith. The two ends of the roller chain are attached to the ends of two control cables which connect to the ends of a roller chain engaging a similar sprocket forming a part of the mechanical linkage at the throttle or clutch at the engine.

The use of balanced control systems is almost as old as ships themselves, and though the control unit required to operate them is not complex, the system itself is too cumbersome and expensive.

The advent of the push-pull control cable, an example of which can be found in the U.S. Patent No. 3,013,443, also to John F. Morse, provided in a single cable the necessary structure for effecting remote control by the application of either tensile or compressive forces.

The simple lever operated sprocket was therefore an ineffectual companion as a control unit for the push-pull cable unless the control force required would only be tensile, as for example in the operation of the spring loaded throttle, the control unit need only apply tensile forces to the push-pull controlled cable and the control unit may comprise a rotatable sprocket or drum which translates the rotative forces applied to a tensile force on the cable by a flexible belt means engaging the periphery of the drum.

It is therefore an object of the present invention to provide a remote control unit employing a drum and flat, flexible belt means capable of imparting both tensile and compressive forces to the attached control cable.

It is another object of the present invention to provide a control unit as above employing a partially perforate flexible belt for non-slipping engagement with a rotative drum having an increased belt life.

It is a further object of the present invention to provide a control unit as above which is adaptable to manipulate either push-to-operate or pull-to-operate engine controls.

It is a still further object of the present invention to provide a remote control unit which imparts a straight line motion to the cable core, which eliminates backlash and the need for the provision of cable swiveling in conjunction with its connection to the control unit.

It is a still further object of the present invention to provide a control unit as above which is free of complexity, efficient, compact and economical to manufacture.

These and other objects which will become apparent from the following specification are accomplished by means hereinafter described and claimed.

One preferred embodiment of the present invention is shown by way of example in the accompanying drawings and hereinafter described in detail without attempting to show all of the various forms and modifications in which the invention might be embodied; the invention being measured by the appended claims and not by the details of the specification.

In the drawings:

FIG. 1 is a perspective view of a control unit according to the present invention with parts broken away;

FIG. 2 is a cross section taken substantially on line 2—2 of FIG. 4;

FIG. 3 is an exploded perspective of the guides, drum and flexible belt forming the working parts of the control unit; and, FIG. 4 is a frontal elevation of the control unit with the front cover plate removed and the drum partly broken away.

Figure 4:
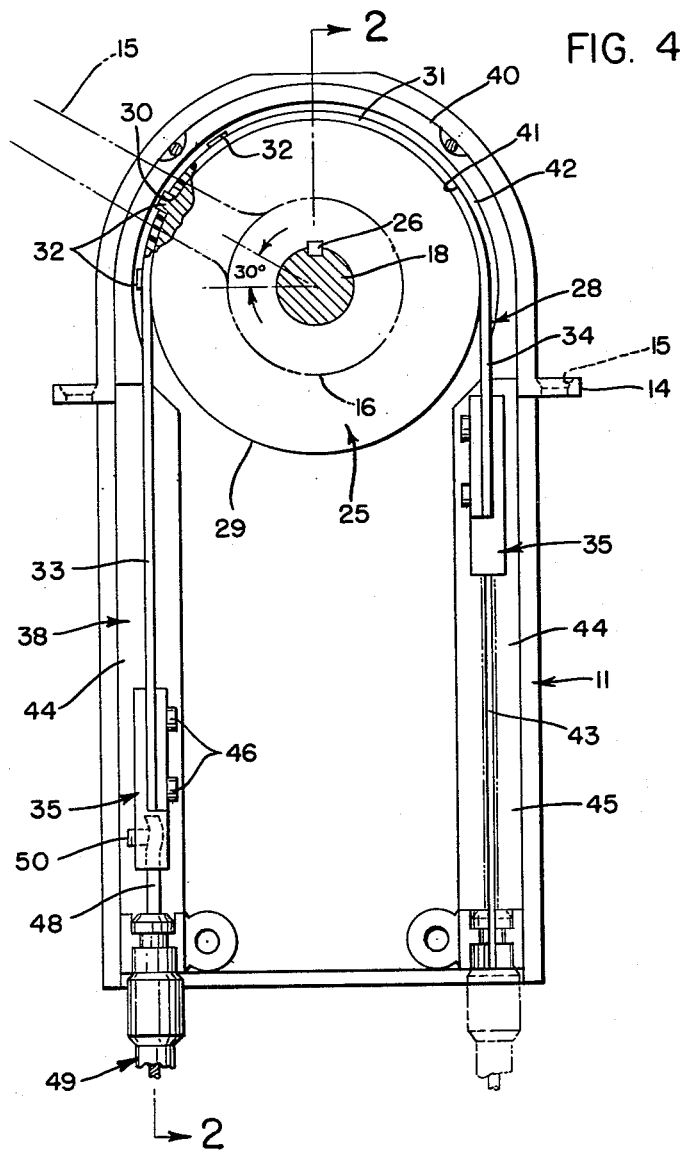

In general, a control unit constructed in accordance with the concept of the present invention comprises a drum rotatable by a control lever to drive a flat, flexible belt engaging a portion of the outer periphery of the drum and interconnected therewith to run without slipping as the drum rotates. The belt is confined to run in a predetermined path by guides which prevent the belt from buckling under the imposition of compressive forces. One or the other end of the belt is connected to a control cable depending on whether, for a given direction of rotation of control lever, it is required to effect a push-to-operate or a pull-to-operate control.

Referring particularly to the drawings, the improved control unit, indicated generally by the numeral 10, is contained in a housing formed by a rear portion 11 and an interfitting front portion 12 removably attached thereto, as by screws 13. Mounting tabs 14 extend outwardly from the housing and are provided at appropriate intervals with bores 15 suitable for receiving mounting screws whereby the unit 10 can be fastened in an upright position on a control pedestal, not shown.

A control lever 15 extends radially outwardly of a hub 16 nonrotatably attached to the end of a shaft 18, as by splines 19, and locked thereon by set screw 20 which is received within an annular groove 21 on shaft 18. Shaft 18 is journaled in a boss 22 on the front portion 12 of the housing with a flanged sleeve bearing 23 preferably interposed between the shaft 18 and the interior of boss 22. The flange portion 24 of the bearing 23 is engagingly positioned between the interior of the front portion 12 of the housing and the drum driving member 25 to provide a braking friction against undesired rotation of drum drive member 25 which is nonrotatably secured to shaft 18, as by key 26. In the preferred form, the flange portion 24 comprises a series of radial leaves or sectors 24a, 24b, 24c, etc., alternately biased against the drum 25 and the front portion 12 of the housing.

The flexible transfer belt 28 which translates the rotating forces imparted by the operation of the control lever 15 into the required axial control forces, frictionally engages the outer periphery 29 of drum drive 25 in a U-shaped configuration and is provided with one or more perforations 30 along its semicircular curved portion 31 to engage corresponding lugs 32 on the mating one half of the periphery 29 of drum 25. The belt may be either a thin, flexible metal or a suitable plastic material. As will be more fully hereinafter described, the lugs 32 and perforations 30 are particularly placed to augment the life of belt 28. The straight or leg portions 33 and 34 of the U-shaped flexible belt 28 extend downwardly and tangentially away from the drum 25 on opposite sides thereof and terminate at a connector block 35, one preferably on the end of each leg portion 33 and 34.

Either formed integrally with each portion 11 and 12 of the housing or separately insertable therein are adjacent, parallel U-shaped guides 38 and 39. The curved portion 40 of each guide 38 and 39 has a confining surface 41 spaced apart from the periphery 29 of drum 25 sufficiently far to receive the belt 28 along its contact with drum 25 and restrain it from moving radially of the drum when the belt is subjected to compressive forces.

A relieved groove 42 is provided in confining surface 41 and has a sufficient width and depth to accommodate lugs 32 without hindering the rotation of drum 25. From each end of the circumferential dimension of confining surface 41 which corresponds to the semicircular contact of belt 28 with drum 25, opposed tangential slots 43 are provided in the leg portions 44 of the U-shaped guides 38 and 39. The edges of the leg portions 33 and 34 of belt 28 are confined in slots 43 for continued restrictive, non-buckling movement when transmitting compressive forces. Those portions of the guides 38 and 39 in sliding contact with belt 28 are preferably made of a material having good wear characteristics compatible with the belt material to assure long life to both, and hence, the control unit itself. The opposing faces 45 of the leg portions 44 are spaced apart sufficiently to permit accommodation of the connector blocks 35 attached to the ends of the belt 28, as by rivets 46.

The core 48 of the push-pull cable 49 is selectively attached to either of the connector blocks 35, as by inserting the end of the core into a bore (not shown) in the end of the block and locking it in place with an Allen screw 50. By providing a connector block 39 at both ends of the belt 28 a control cable may be selectively connected to the unit to provide for the operation of a push-to-operate or a pull-to-operate control with rotations of the conrol lever 15 in either direction.

The casing 51 and sheath 52 of the push-pull cable 49 are attached to one end of the bushing 53 which is in turn matingly engaged between the outer ends of the leg portions 44 of the guides 38 and 39 for fixed retention with respect to the housing, thus assuring that straight line motion is imparted to the cable core 48 without the need for a swivel connection of the cable to the control unit.

The other end of the push-pull cable is suitably attached to either the throttle or clutch of an engine.

The applicant has found that a far greater belt life is attained if the perforations 30 are not flexed. As will be apparent from a study of the figures, the only point at which flexure of the belt 28 occurs in the subject control unit is where the belt leaves the drum 25. On one side of that point the belt is always straight and on the other side the belt is always maintained in an arc of constant curvature, i.e., the circumference of the drum. Thus, if the perforations are so placed as to never leave the drum there will be no flexure at a perforation and the belt life will be greatly increased.

By placing the lugs 32 on radii 30° apart, three lugs can be provided on the drum 25 and positioned such that approximately 60° rotation thereof is possible in either direction from a neutral position without flexure of the belt 28 at a perforation 30. This is the situation depicted in FIG. 3 with the center of the three lugs 32 positioned vertically upwardly of the rotational axis of the drum. This would be desirable, for example, to operate a clutch from neutral to forward and from neutral to reverse position.

Or, if the application requires rotation in only one direction from a neutral position, as for advancement of a throttle, the lugs can be so positioned with respect to the neutral orientation of the control lever that approximately 120° of rotation is provided without flexure of the belt at a perforation.

In marine intallations the actuation of most all clutches or throttles can be accomplished with a ¾" to a 2¾" axial translation of the control cable core. Thus, a 2½" to 3" diameter drum 25 with three lugs 32, as heretofore described, can supply sufficient cable core translation necessary to effect the actuation of most known controls. This permits the control unit to be compact as well as efficient and accomplish the objects of the invention.

What is claimed is:

1. A remote control unit for operating an engine control by a push-pull cable comprising, a drum drive member rotatable by a control lever, a U-shaped, flat, flexible band, the curved portion of said band engaging one half the periphery of said drum drive member, the leg portions of said U-shaped band extending tangentially outwardly from said drum drive member, a curved confining surface to restrain the curved portion of said band against one half the periphery of said drum drive member, opposed continuous guide slots slidably receiving the edges of the leg portions of said band to prevent buckling of said leg portions, engaging means interconnecting said band and said drum drive member to prevent said band from slipping on said drum drive member, and at least one end of said band adapted to be connected to the core of said push-pull cable.

2. A remote control unit for operating an engine control by a push-pull cable comprising, a drum drive member rotatable by a control lever, a U-shaped, flat, flexible band, the curved portion of said band engaging one half the periphery of said drum drive member, the leg portions of said U-shaped band extending tangentially outwardly from said drum drive member, a curved confining surface to restrain the curved portion of said band against one half of the periphery of said drum drive member, opposed continuous guide slots slidably receiving the edges of the leg portions of said band to prevent buckling of said leg portions, engaging means interconnecting said band and said drum drive member to prevent said band from slipping from said drum drive member and a connector block attached to the end of at least one said leg portion and movable therewith between said opposed guide slots, said connector block adapted to be connected to the core of a push-pull cable.

3. A remote control unit for operating an engine control by the core of a push-pull cable comprising, a drum drive member rotatable by a control lever, a U-shaped, flat, flexible band, the curved portion of said band engaging one half the periphery of said drum drive member, the leg portions of said U-shaped band extending tangentially outwardly from said drum drive member, a curved confining surface to restrain the curved portion of said band against one half the periphery of said drum drive member, opposed continuous guide slots slidably receiving the edges of the leg portions of said band to prevent buckling of said leg portions, at least one end of said band adapted to be connected to the core of said push-pull cable, a plurality of perforations in said band, an equal number of lugs on the outer periphery of said drum drive member engaging said perforations, said lugs confined to not more than about 60° of the periphery of said drum drive member in order that the perforated portion of said band can maintain continuous contact with said drum drive member as said drive member is rotated to move the core of said push-pull cable through its operating range.

4. A remote control unit for operating an engine control by the core of a push-pull cable comprising, a drum drive member rotatable by a control lever, a U-shaped, flat, flexible band, the curved portion of said band engaging one half the periphery of said drum drive member, the leg portions of said U-shaped band extending tangentially outwardly from said drum drive member, a curved confining surface to restrain the curved portion of said band against one half the periphery of said drum drive member, opposed guide slots slidably receiving the edges of the leg portions of said band to prevent buckling of said leg portions, at least one end of said band adapted to be connected to the core of said push-pull cable, a plurality of perforations in said band, an equal number of lugs on the outer periphery of said drum drive member engaging said perforations, said lugs confined to not more than about 60° of the periphery of said drum drive member in order that the perforated portion of said band can maintain continuous contact with said drum drive member as said drive member is rotated to move the core of said push-pull cable through its operating range and a relieved groove in said confining surface through which said lugs are freely movable when said drum drive member is rotated.

References Cited by the Examiner
UNITED STATES PATENTS

| | | | |
|---|---|---|---|
| 1,848,280 | 3/32 | Statz | 74—501 X |
| 1,848,749 | 3/32 | Reichold | 74—501 X |
| 1,935,806 | 11/33 | Mautsch | 74—222 |
| 2,287,968 | 6/42 | Broulhiet | 74—501 |
| 2,302,158 | 11/42 | Van Vulpen | 74—501 X |
| 2,451,815 | 10/48 | Donnell et al. | 74—501 X |
| 2,737,822 | 3/56 | Morse | 74—222 |
| 3,013,443 | 12/61 | Morse | 74—501 |
| 3,046,799 | 7/62 | Ash et al. | |
| 3,088,330 | 5/63 | Thompson. | |
| 3,091,130 | 5/63 | Payerle et al. | 74—501 X |
| 3,118,321 | 1/64 | Rinke | 74—501 X |

BROUGHTON G. DURHAM, *Primary Examiner.*